2 Sheets--Sheet 1.

H. M. RICHARDSON.

Children's Carriages.

No. 6,121. Reissued Nov. 3, 1874.

*Witnesses;*

D. L. Coombs

L. B. Jones

*Inventor:*

Henry M. Richardson.

By James L. Norris.

Atty.

THE GRAPHIC CO. PHOTO-LITH. 39 & 41 PARK PLACE, N.Y.

H. M. RICHARDSON.

Children's Carriages.

No. 6,121. Reissued Nov. 3, 1874.

Witnesses:

J. L. Coombs

J. B. Jones

Inventor:

Henry M. Richardson,

By James L. Norris,

Atty.

THE GRAPHIC CO. PHOTO-LITH. 39 & 41 PARK PLACE, N.Y.

UNITED STATES PATENT OFFICE.

HENRY M. RICHARDSON, OF BOSTON, MASSACHUSETTS.

IMPROVEMENT IN CHILDREN'S CARRIAGES.

Specification forming part of Letters Patent No. 143,421, dated October 7, 1873; reissue No. 6,121, dated November 3, 1874; application filed October 27, 1874.

*To all whom it may concern:*

Be it known that I, HENRY M. RICHARDSON, of Boston, in the county of Suffolk and State of Massachusetts, have invented certain new and useful Improvements in Children's Carriages, of which the following is a specification:

This invention has for its object to provide a child's carriage with a top or canopy, which is supported upon standards in such a manner that the same may be dropped in rear of or behind the seat and body, or be held in an upright or other desired position, or dropped in front of the seat.

My invention consists in supporting the top or canopy of a child's carriage upon standards or arms, which are pivoted to the sides of the body, so that said top or canopy may be dropped behind the seat and body, or in front of it, or be held in an upright position, or set and retained in any desired or intermediate position over the carriage with respect to its seat.

The invention also consists of a new and improved standard or arm for supporting the top or canopy of a child's carriage, the same consisting of two parts or sections, which are pivoted together by a suitable joint, one of said sections being provided with a locking device, preferably a spring catch or bolt, or equivalent device, which is connected with one of the said sections, and is constructed to interlock with the other in such a manner that when applied to a carriage body and top the latter can be supported over the carriage-body in an upright position, or otherwise fixed or inclined at various angles, so that the occupant of the carriage can be effectually protected from the rays of the sun, as also from cold or strong wind, or from dust, by adjusting and setting the top or canopy in proper position with respect to the seat of the carriage.

In the accompanying drawings, like letters of reference indicate corresponding parts in each figure.

Figure 1:
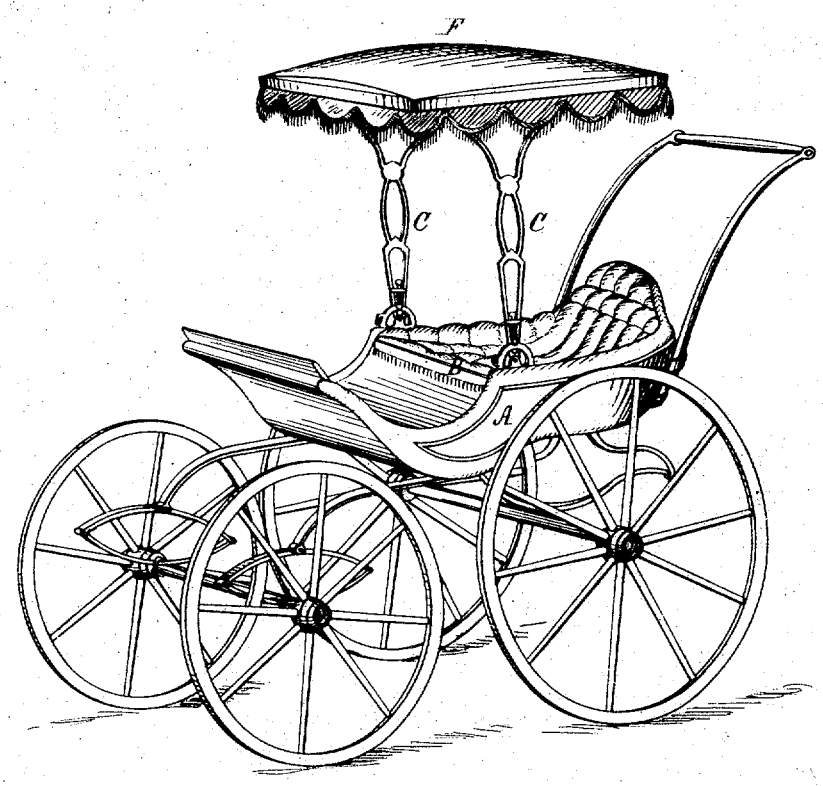
Figure 2:
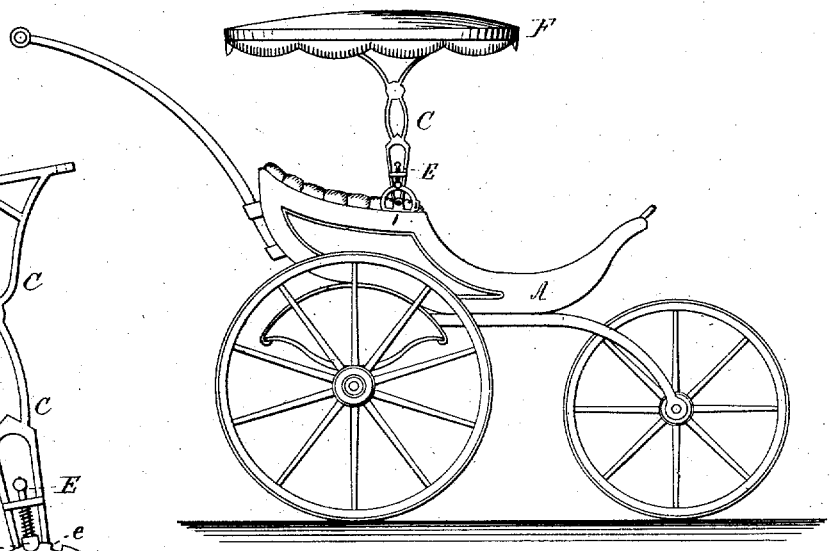
Figure 4:
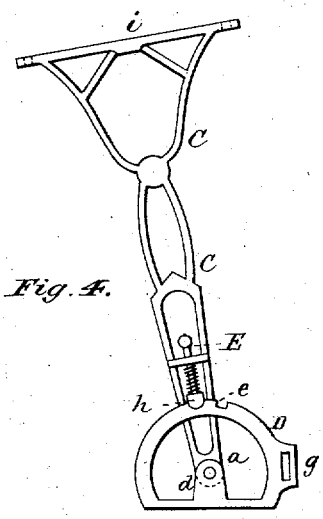
Figure 3:
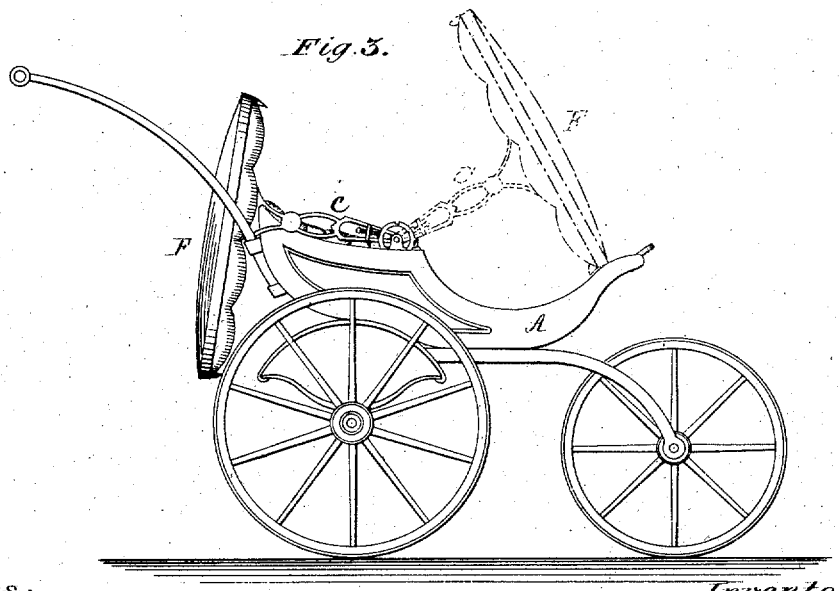

Figure 1 is a perspective view of a child's carriage or perambulator, illustrating the top or canopy of a carriage in an upright position over the body, showing my improved standards and a locking device attached thereto for retaining the same in such desired position. Fig. 2 is a side elevation of the same. Fig. 3 illustrates the top or canopy dropped in the rear of or behind the seat and body by means of my improved supporting-standards, the dotted lines showing that it may, if desired, be dropped in front. Fig. 4 is a side elevation of the new and improved standards, the same being constructed in the present example in two sections or parts, which are connected together by a hinge-joint and supplied with a locking device, such standards being adapted for use with the top and body of a carriage.

Referring to the drawings, the letter A designates the body of a child's carriage, in the present example provided with the usual seat B, the whole being mounted or supported upon a running-gear of any of the many well-known constructions. In the top or canopy, in the present example, a rigid top is connected with or to the sides of the body by means of standards C C, which are made in two parts or sections, which are connected together by a hinge-joint, as at *a*, the parts or sections composing the improved standard being designated by the letters *c d*, as clearly illustrated in the several figures, and especially in Fig. 4. The sections or parts composing the standards may be constructed of any ornamental form, preferably of light open-work or of skeleton form, as illustrated, and may be made of metal or other suitable material. The lower section *d* of the standards is combined and intimately connected with an arc-shaped iron, D, which is constructed with recesses or seats *e*, designed to receive a locking catch or bolt, E, or other equivalent device, connected with the section *c* in such a manner as to engage with said recess or seat when the said section *c* is brought in a line with the section *d*, so that the same are substantially connected together. The arc-shaped irons are especially adapted to be connected to or with the sides of the carriage, at or near the front end of the seat, and may be constructed with a seat to form a convenient and ornamental device for receiving a guard-strap for preventing a child from falling from the seat.

The opposite sides of the arc-irons should be constructed with a lug or shoulder *h*, so as to embrace the arc and prevent any lateral motion of the standard, so wrought and arranged as to leave them free to traverse the arcs in either direction, when moved back or forward thereon.

The section *c* should, as in the present example, have its terminal end constructed of a considerable width and length, as at *i*, so as to present a suitable base or foundation for receiving, supporting, and bracing the top or canopy F, it now, in the present instance, being illustrated as of rigid form, though, it is evident, any of the well-known forms of tops or canopies may be used.

It will thus be seen that, by using standards made in two parts or sections, and connected by a hinge-joint, and providing the same with a locking mechanism, the upper section or part can be adjusted either in a vertical, inclined, or set at various angles with respect to the lower section, the result being that, if the top or canopy of a child's carriage be connected rigidly or otherwise with such upper section, it (the top) can be dropped in rear of or behind the seat and body, or be held in an upright position, or inclined at various angles over the carriage-body; and when so positioned and secured in place by the locking mechanism acting on the standards, (such as a spring-bolt, or other equivalent fastening device,) the child occupying the seat in the carriage can be protected from the sun, wind, or dust.

The advantages attained by having the top or canopy so constructed as to be capable of being inclined at various angles, as well as being placed upright or thrown back behind the seat and body, or may be lowered in front of the seat, the construction of the standards in the present example admitting of such, are numerous and important.

By this means the child can be effectually protected from the rays of the sun in front, as well as from above and behind, and also from cold or strong winds, or from dust; and, moreover, the nurse or person driving the carriage from behind will be enabled to watch the child constantly, speak to it, and attend to many of its requirements, without leaving her position in the rear.

A top or canopy constructed in accordance with my improvements may also be applied to other than children's carriages, if found desirable.

Having thus described my invention, what I claim is—

1. A top or canopy fixed upon standards pivoted to the sides of a child's carriage, combined with a locking device attached to one of the standards, so that such top or canopy may be dropped behind the seat and body, or be held in an upright or other intermediate adjusted position with respect to the seat, for the purpose specified.

2. A standard for supporting carriage-tops composed of two sections or parts, in combination with a spring locking device connected to move with one of the parts or sections, so that a carriage-top supported thereby may be dropped behind the seat and body, or be held in an upright position or dropped in front of the seat, substantially as and for the purpose specified.

3. A standard for supporting carriage-tops composed of two sections, connected together and provided with mechanism for locking such sections in the desired position, so that a carriage-top supported thereon may be dropped behind the seat or body, or held in an upright or inclined position, all combined substantially as described.

4. In a child's carriage, a top or canopy fixed upon arms pivoted to the sides of the body, so that said top or canopy may drop behind the seat and body, or in front of it, or be held in an upright or intermediate position by a locking device on one of the arms, all combined substantially as and for the purposes set forth.

5. The combination of standards having the spring-bolts and pivoted upon arc-shaped irons, adapted to be applied to the body of a child's carriage, so as to permit a carriage-top supported thereby being dropped behind the seat or body, or held in an upright position, or inclined at various angles with respect to the seat, substantially as and for the purpose specified.

In testimony whereof I have hereunto set my hand this 17th day of September, A. D. 1874.

Witnesses: H. M. RICHARDSON.
JAMES L. NORRIS,
A. H. NORRIS.